Patented May 25, 1943

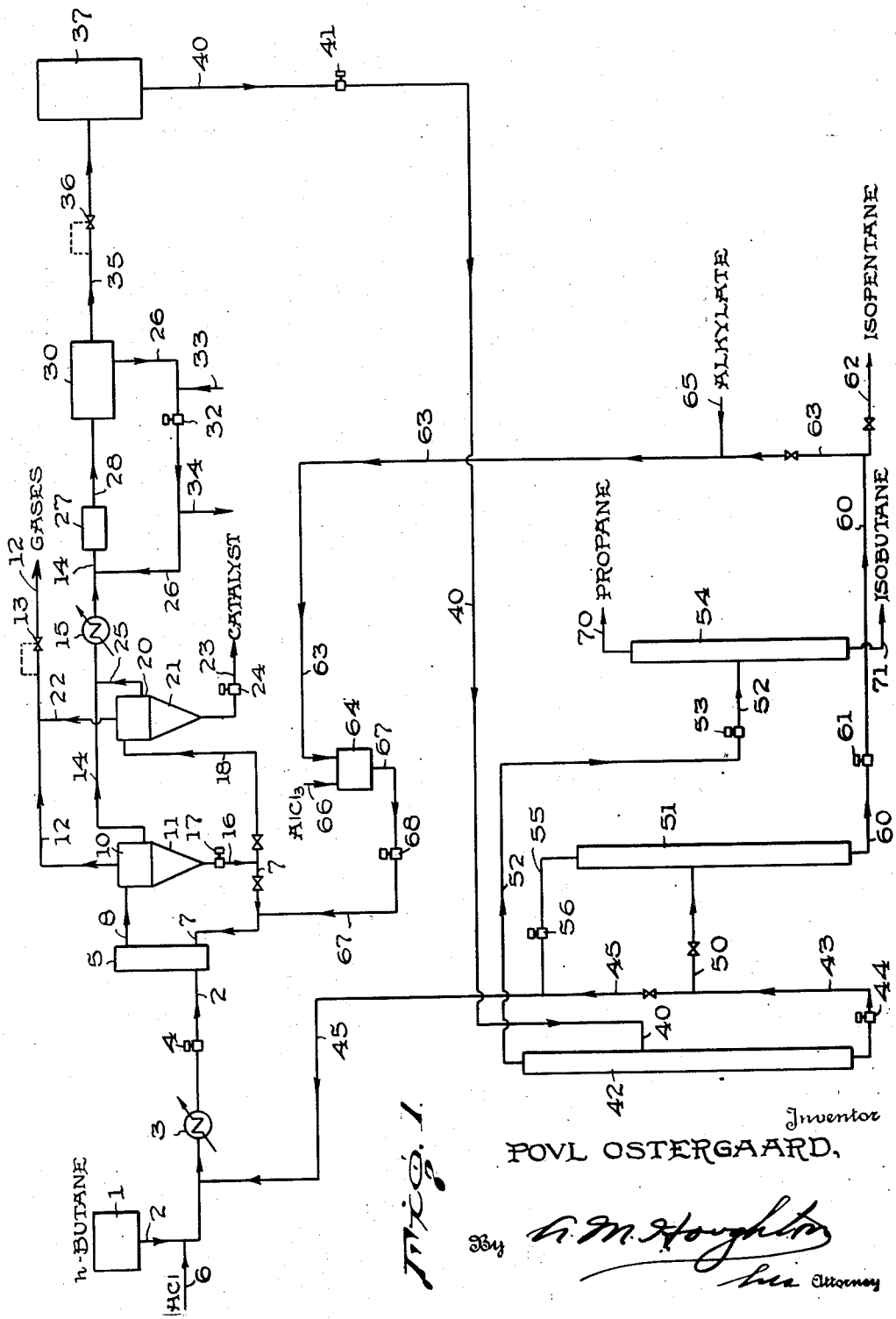

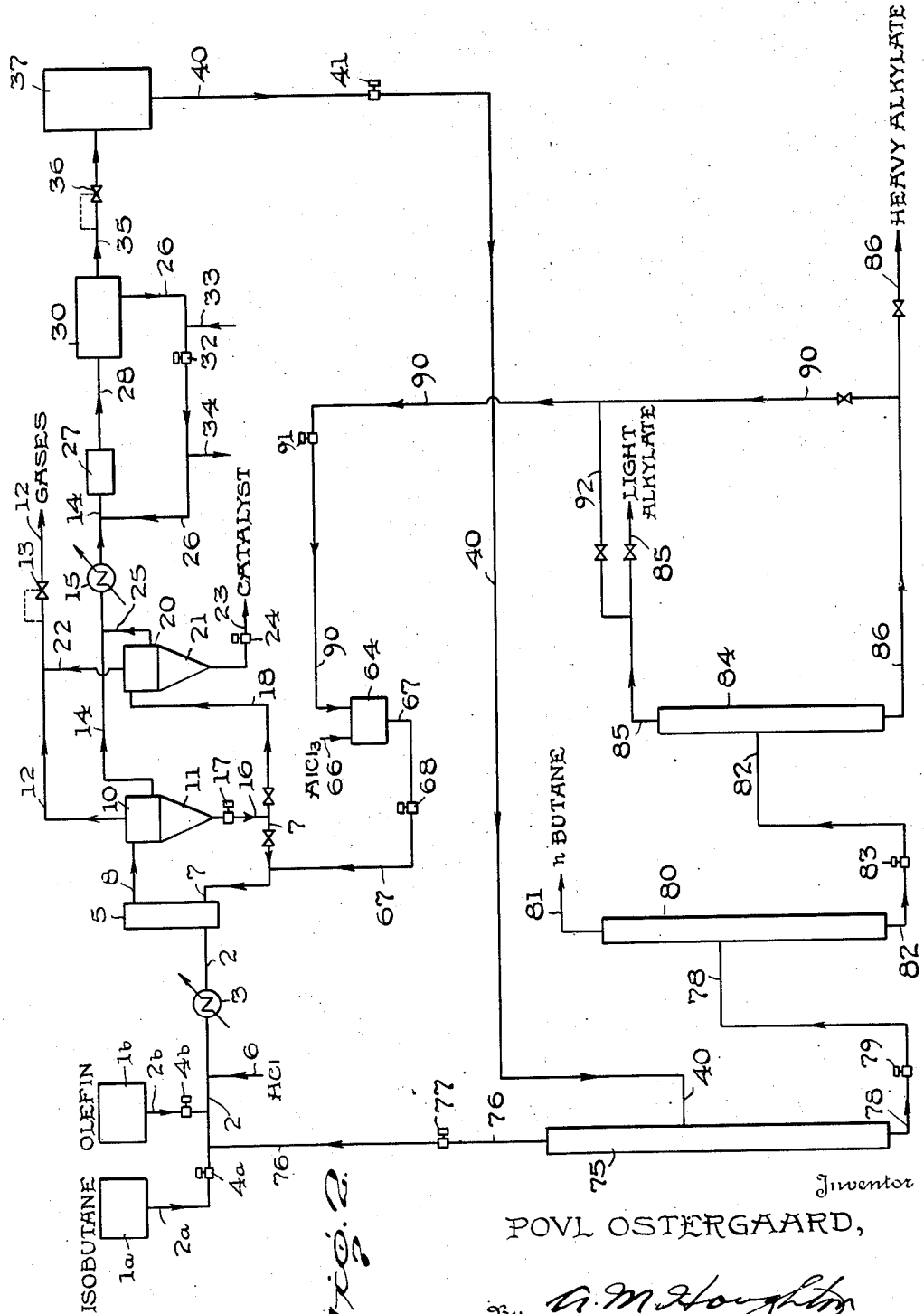

2,320,293

UNITED STATES PATENT OFFICE 2,320,293

CONVERSION OF PARAFFINIC HYDROCARBONS

Povl Ostergaard, Mount Lebanon, Pa., assignor to Gulf Oil Corporation, Pittsburgh, Pa., a corporation of Pennsylvania Application October 3, 1941, Serial No. 413,510

14 Claims. (Cl. 260—683.4)

This invention relates to the conversion of paraffinic hydrocarbons.

Normal paraffins can be isomerized to branched-chain paraffins by contact with an aluminum halide catalyst under suitable conditions, and branched-chain or iso-paraffins can be alkylated with olefins to produce higher iso-paraffins which constitute high octane number gasoline boiling range fuels, likewise by contact with aluminum halide catalysts under suitable conditions. For example, normal butane, when contacted with aluminum chloride or aluminum bromide at an elevated temperature, undergoes conversion to isobutane, and when a large molecular excess of isobutane is contacted with ethylene or other lower olefin at normal or slightly elevated temperatures in the presence of aluminum chloride or aluminum bromide, the isobutane combines with ethylene or other olefin to produce a mixture of higher isoparaffinic hydrocarbons boiling within the gasoline boiling point range and having a high octane number.

Nevertheless there are certain difficulties in the use of the solid aluminum halides as catalysts for the isomerization and alkylation of paraffinic hydrocarbons and such use is susceptible to improvement.

In the copending application Serial No. 408,242 of Leslie U. Franklin, Marshall Elliott and William S. Bonnell, filed August 25, 1941, there is described and claimed an improved method of isomerizing and alkylating paraffinic hydrocarbons wherein the hydrocarbon reactant material is contacted with a liquid aluminum halide catalyst comprising a stable dispersion of an aluminum halide catalyst in a liquid product of alkylating a paraffin with an olefin. By this means, certain difficulties in the isomerization and alkylation of paraffinic hydrocarbons in the presence of aluminum halides are obviated.

Another improvement in paraffin isomerization and alkylation is described and claimed in the copending application Serial No. 408,270, of William W. Weinrich, Louis H. Huth and Clark A. Holloway, Jr., filed August 25, 1941, such improvement comprising contacting the hydrocarbon reactant material with a liquid aluminum halide catalyst comprising a stable dispersion of an aluminum halide catalyst in a liquid or low melting solid natural petroleum oil fraction which contains not more than about 25 per cent of total aromatics. Examples of suitable petroleum oil fractions are straight run Pennsylvania kerosene and straight run Pennsylvania gas oil.

Catalysts of the type descried and claimed in the aforesaid applications, as well as other liquid aluminum halide-hydrocarbon catalysts with which this invention is concerned, are substantially immiscible with liquid petroleum hydrocarbons, including the products of paraffin isomerization and alkylation.

I have found, however, that the use of liquid aluminum halide-hydrocarbon catalysts of the type described and claimed in the above-identified applications, as well as the use of other liquid aluminum halide-hydrocarbon catalysts, for the liquid phase isomerization and alkylation of paraffinic hydrocarbons can be greatly improved.

I have found that in employing liquid aluminum halide-hydrocarbon catalysts, such as aluminum chloride-alkylate bottoms or aluminum chloride-Pennsylvania kerosene catalysts, for the liquid phase isomerization and alkylation of paraffinic hydrocarbons, it is necessary, in order to obtain the greatest possible rate of reaction, not only to employ a continuous process wherein catalyst and hydrocarbon reactant material are continuously contacted, reaction product and catalyst are separated from the resulting mixture, and the separated catalyst is recycled, but it is also important to contact the hydrocarbon reactant material with the catalyst so thoroughly and intimately that an emulsion or near-emulsion is produced with substantially no tendency to separate in the reaction zone and which is slow to separate by gravity separation even after removal from the reaction zone. I have further found that, under such conditions, the problem of separating catalyst from reaction product by prior methods of operation becomes so difficult at high rates of flow that by ordinary methods of separation, separating vessels of uneconomically large size or number must be used.

I have now found, however, that such difficultly separable mixtures of catalyst and hydrocarbon reaction product produced in high speed mixing apparatus or the like can be readily separated, for example, by gravity, into an upper hydrocarbon layer substantially free from catalyst and constituting the major part of the reaction product, and a lower layer of catalyst containing a substantial amount of reaction product, and that by first effecting such a partial separation, recycling part, advantageously the major part, of the separated catalyst containing reaction product to the reaction zone, and effecting a substantially complete separation, for example by gravity, of the unrecycled portion of said separated catalyst into catalyst and hydrocarbon reaction product, the practical difficulties of high speed, commercial processes of isomerization and alkylation of paraffins using liquid aluminum halide-hydrocarbon catalysts are largely or completely obviated.

An important advantage of effecting complete separation of catalyst from reaction product in two steps, as described, is that the necessity of uneconomically large or numerous separating vessels is obviated.

A further and related object achieved by this invention is a means of maintaining a constant amount of active aluminum halide-hydrocarbon catalyst in the system, as much as possible without recourse to materials obtained from outside the process. This object is achieved as follows:

In the isomerization of a paraffinic hydrocarbon a certain amount of cracking normally occurs which results in the formation of higher as well as lower hydrocarbons. For example, in the isomerization of n-butane to iso-butane, a pentane fraction is obtainable on fractionally distilling the reaction product, such fraction being mainly iso-pentane. Similarly, in the alkylation of a paraffin with an olefin, side reactions result in the formation of high boiling and low boiling ends which are largely iso-paraffinic. For example, in the alkylation of iso-butane with the butylenes, a certain amount of $C_9$ and higher iso-paraffins are formed, as well as $C_3$, $C_7$, and lower iso-paraffins. Although the iso-pentane produced as a byproduct in the isomerization of n-butane, and the $C_9$ and higher isoparaffins produced as byproducts in the alkylation of paraffins with olefins, have a certain fuel value, they are nevertheless somewhat of the nature of waste products, being less useful and valuable than the primary reaction products.

I effectively utilize part or all of such high boiling ends of isomerization and alkylation reactions by heating and mixing them with an aluminum halide, advantageously at a temperature between about 150° and 250° F. and for a time and in amounts sufficient to produce a liquid catalyst containing not less than about 50 per cent by weight of aluminum halide stably dispersed therein, as described in the aforesaid copending applications, and I introduce the catalyst thus produced, with such further quantities of a like catalyst derived from some other source as may be necessary, into the reaction system and remove from the system a corresponding amount of catalyst which has been substantially completely separated from reaction product. The amount of fresh catalyst introduced and the amount of used catalyst removed is such that the desired amount of active catalyst is maintained in the system.

In a particularly advantageous embodiment of this feature of the invention, I so regulate the conditions of reaction and the fractionation of the reaction product that a sufficient amount of high boiling iso-paraffinic ends is produced to supply the iso-paraffinic hydrocarbon necessary for producing fresh catalyst. This may be done, for example, by the use of temperatures sufficiently high or times of contact sufficiently long to produce the necessary high boiling ends.

A still further and related object achieved by my invention comprises a careful regulation of the temperature and pressure of the reactants whereby they are maintained at substantially constant temperature and pressure in the reaction zone. I accomplish this object of the invention by the use of heating or refrigerant means, whereby the reactants are kept heated to a constant reaction temperature or heat of reaction is absorbed as rapidly as formed, and by the use of pressure regulating devices, whereby a constant reaction pressure is maintained. Advantageously, I introduce the reactants or reactant into the reaction zone under pressure and maintain, by suitable pressure regulating valves, a controlled back pressure on the lines and apparatus serving to remove the reaction mixture, thereby maintaining constant pressure in the reaction zone.

I have found that substantial constancy of temperature and pressure in the reaction zone are very important; without such, the yields of desired product are lower and in general the processes of isomerization and alkylation in the presence of aluminum halide catalysts are exceedingly difficult to control in large, continuous-process installations and the results obtained are erratic. By observing constancy of temperature and pressure, however, I am able to obtain very uniform and good results.

My invention may be further illustrated and better understood by reference to the two diagrammatic drawings which accompany and form a part of this specification.

Referring to Fig. 1, liquid normal butane stored in storage vessel 1 is pumped through a line 2 and a heat exchanger 3 by a pump 4 into a reaction vessel 5. Heat exchanger 3 is so operated, by the use of a hot or a cold fluid, that the liquid normal butane is brought to the desired reaction temperature before it enters reaction vessel 5. Reaction vessel 5 is advantageously provided with means to produce violent agitation and thorough intermingling of the reactants and it is provided with means for maintaining the reaction mixture at a constant temperature.

Minor amounts of HCl are introduced through a line 6 into line 2 and thus into reaction vessel 5. A liquid aluminum chloride-hydrocarbon catalyst, part of which is recycled catalyst and part of which is prepared as described below, is introduced into reaction vessel 5 through a line 7 and the catalyst, liquid n-butane and HCl are intimately contacted with each other in reaction vessel 5 at a suitable constant reaction temperature and under a constant pressure sufficient to maintain the butanes in liquid state, thereby causing rapid isomerization of n-butane to iso-butane. The temperature of the reactants is maintained constant by continuously removing any heat liberated by the reaction, or by supplying heat if necessary. Heating or cooling coils may be used for this purpose. A mixture of catalyst and reaction product, including unconverted n-butane and HCl, is withdrawn from reaction vessel 5 through a line 8 and introduced into a separating vessel 10 which is provided with a cone-shaped bottom 11. In separator 10 the mixture is allowed sufficient time to separate into a top layer of gases containing HCl, an upper liquid layer of reaction product consisting mainly of isobutane and unconverted n-butane and substantially free from catalyst, and a lower liquid layer of catalyst containing substantial amounts of reaction product including unconverted n-butane. The gases at the top are vented through a line 12 controlled by a pressure regulating valve 13. Reaction product substantially free from catalyst is removed from separator 10 through a line 14 and cooler 15. Catalyst is pumped through a line 16 by a pump 17 and the major part thereof passes through valved line 7 back into reaction vessel 5. A minor part of the separated catalyst is passed through a valved line 18 to a separating vessel 20 which may be, as shown, considerably smaller in size than separator 10 and which is provided with a cone-shaped bottom 21. In separator 20 the catalyst-reaction product mixture is allowed sufficient time to separate substantially completely into a lower liquid layer of catalyst and an upper liquid layer of reaction product. Any gases in separator 20 are withdrawn and passed through a line 22 to line 12 and thus are removed from the system. Catalyst is pumped from the bottom of separator 20 through a line 23 by a pump 24, either to waste or for such utilization as may be desired. Reaction product substantially free from catalyst is removed from separator 20 and passed through a line 25 into line 14 where it mixes with the major part of the reaction product separated in separator 10. Caustic soda solution is introduced through a line 26 into line 14 and the combined reaction prodduct and caustic soda solution are mixed in a mixer 27 and passed through a line 28 to a separating vessel 30 wherein a lower layer of caustic soda solution and an upper layer of washed, neutralized reaction product are formed. Used caustic soda solution is withdrawn from separator 30 and recycled through line 26 by a pump 32 to line 14 and thus back into mixer 27. Fresh caustic soda solution is introduced into and used caustic soda solution is removed from line 26 through the lines 33 and 34, respectively.

Washed, neutralized reaction product is withdrawn from separating vessel 30 through a line 35 controlled by a pressure regulating valve 36 and introduced into a holding vessel 37. From holding vessel 37 the reaction product is pumped through a line 40 by a pump 41 into a fractionating column 42 where the mixture is fractionated into an overhead of isobutane and propane and a bottoms of n-butane and pentane, the latter being chiefly iso-pentane. The n-butane-pentane bottoms is pumped through a line 43 by a pump 44. Part of the n-butane-pentane bottoms thus removed is recycled through valved line 45 to line 2 and thus back into reaction vessel 5, while the remaining part of the n-butane-pentane bottoms is caused to pass through a valved line 50 into a fractionating column 51. The isobutane-propane overhead from column 42 is pumped through a line 52 by a pump 53 to a fractionating column 54.

In fractionating column 51 the mixture introduced thereinto is fractionated into an overhead of n-butane and a bottoms of pentanes, principally iso-pentane, while in fractionating column 54 the mixture introduced thereinto is fractionated into an overhead of propane and a bottoms of isobutane. The n-butane overhead of fractionating column 51 is pumped through a line 55 by a pump 56 into line 45 and thus back into reaction vessel 5, while the pentane bottoms of fractionating column 51 is pumped through a line 60 by a pump 61. Part of the pentane bottoms may be removed from the system through a valved line 62 but part at least is passed through a valved line 63 into a catalyst mixing vessel 64. Alkylate bottoms such as that left as residue after distilling off gasoline boiling range hydrocarbons from the alkylation product of a paraffin and an olefin may also be introduced through a line 65.

Pentane bottoms, with or without added alkylate bottoms, is introduced into vessel 64 as described, along with anhydrous aluminum chloride, which is introduced through a line 66 and the mixture is stirred and heated in vessel 64 to 150° to 250° F. by means not shown for a time and in amounts sufficient to produce a liquid catalyst containing not less than about 50 per cent by weight of aluminum chloride. This catalyst, after separation by suitable means (not shown) of excess aluminum chloride or hydrocarbons, if any, is pumped through a line 67 by a pump 68 into line 7 and thus into reaction vessel 5.

The propane overhead of fractionating column 54 is removed from the system through a line 70, while the isobutane bottoms of this column is removed from the system through a line 71 for suitable use, e. g. for alkylating olefins as described below in connection with Fig. 2.

In operating the system described above with reference to Fig. 1 of the drawings, the production of catalyst in vessel 64 and the removal of catalyst through line 23 are so co-ordinated that a constant amount of active catalyst is maintained in the system, and this is most advantageously and economically accomplished by so conducting the isomerization in vessel 5 and so regulating the fractionating system represented by columns 42, 51 and 54 that the amount of pentane bottoms pumped from column 51 into catalyst mixing vessel 64 is sufficient, together with the necessary aluminum chloride, to produce all of the necessary catalyst.

The pressure in the system included within vessels 5, 10, 20, 27 and 30 is maintained at the desired constant level by means of regulating valves 13 and 36.

Referring to Fig. 2, isobutane contained in a storage vessel 1a and an olefin such as ethylene, propylene, butylene, or a mixture of such olefins contained in a storage vessel 1b are pumped through the lines 2a and 2b by the pumps 4a and 4b, respectively, into a line 2 and through a heat exchanger 3 into a reaction vessel 5, which is advantageously of the same design as described in connection with Fig. 1.

Minor amounts of HCl are introduced through a line 6 into line 2 and thus into reaction vessel 5. A liquid aluminum chloride-hydrocarbon catalyst, part of which is recycled catalyst and part of which is prepared as described below, is introduced into reaction vessel 5 through a line 7 and the catalyst, isobutane, olefin and HCl are intimately contacted with each other in reaction vessel 5 at a suitable constant reaction temperature and under a constant pressure sufficient to maintain the hydrocarbons in liquid state, thereby causing rapid alkylation of isobutane by olefin. The temperature of the reactants is maintained constant by continuously removing any heat liberated by the reaction, or by supplying heat if necessary. Heating or cooling coils may be used for this purpose. A mixture of catalyst and reaction product, including unreacted isobutane and HCl, is withdrawn from reaction vessel 5 through a line 8 and introduced into a separating vessel 10 provided with a cone-shaped bottom 11. In separator 10 the mixture is allowed sufficient time to separate into a top layer of gases containing HCl, an upper liquid layer of reaction product consisting mainly of normally liquid iso-paraffinic hydrocarbons and unreacted isobutane substantially free from catalyst, and a lower liquid layer of catalyst containing substantial amounts of reaction product including unreacted isobutane. The gases at the top are vented through a line 12 controlled by a pressure regulating valve 13. Reaction product substantially free from catalyst is removed from separator 10 through a line 14 and cooler 15. Catalyst is pumped through a line 16 by a pump 17 and the major part thereof is passed through valved line 7 back into reaction vessel 5. A minor part of the separated catalyst is passed through a valved line 18 to a separating vessel 20 which may be, as shown, considerably smaller in size than separator 10 and which is provided with a cone-shaped bottom 21. In separator 20 the catalyst-reaction product mixture is allowed sufficient time to separate substantially completely into a lower liquid layer of catalyst and an upper liquid layer of reaction product. Any gases in separator 20 are withdrawn and passed through a line 22 to line 12 and thus are removed from the system. Catalyst is pumped from the bottom of separator 20 through a line 23 by a pump 24, either to waste or for such utilization as may be desired. Reaction product substantially free from catalyst is removed from separator 20 and passed through a line 25 into line 14 where it mixes with the major part of the reaction product separated in separator 10. Caustic soda solution is introduced through a line 26 into line 14 and the combined reaction product and caustic soda solution are mixed into a mixer 27 and passed through a line 28 to a separating vessel 30 wherein a lower layer of caustic soda solution and an upper layer of washed, neutralized reaction product are formed. Used caustic soda solution is withdrawn from separator 30 and recycled through line 26 by a pump 32 to line 14 and thus back into mixer 27. Fresh caustic soda solution is introduced into and used caustic soda solution is removed from line 26 through the lines 33 and 34, respectively.

Washed, neutralized reaction product is withdrawn from separator 30 through a line 35 controlled by a pressure regulating valve 36 and is introduced into a holding vessel 37. From holding vessel 37 the reaction product is pumped through a line 40 by a pump 41 into a fractionating column 75. In fractionating column 75 the mixture introduced thereinto is fractionated into an overhead of isobutane and a bottoms of de-isobutanized alkylation product. The isobutane overhead is recycled through a line 76 by a pump 77 to line 2a and thus back to reaction vessel 5. The de-isobutanized alkylate bottoms of column 75 is pumped through a line 78 by a pump 79 to a fractionating column 80 wherein the mixture is fractionated into an overhead of n-butane and a bottoms of completely de-butanized alkylate. The n-butane overhead is removed from the system through a line 81 and the de-butanized alkylate bottoms is pumped through a line 82 by a pump 83 into a fractionating column 84. In column 84 the mixture introduced thereinto is fractionated into an overhead of light alkylation product and a bottoms of heavier alkylate. The light alkylate overhead is withdrawn from the system through a valved line 85 and may be used as, or as a constituent of, high octane number aviation fuel. The heavier alkylate bottoms may be withdrawn from the system through a valved line 86.

A part or all of the heavier alkylate bottoms of column 84 is diverted and pumped through a valved line 90 by a pump 91 into a catalyst mixing vessel 64. A part of the light alkylate overhead of column 84 may be diverted through a valved line 92 to line 90 and thus to catalyst mixing vessel 64.

Alkylate overhead or bottoms, or both, are introduced into vessel 64 as described above along with anhydrous aluminum chloride, which is introduced through a line 66, and the mixture is stirred and heated as described in the aforesaid copending applications to 150° to 250° F. in vessel 64 by means not shown for a time and in amounts sufficient to produce a liquid catalyst containing not less than about 50 per cent by weight of aluminum chloride. This catalyst, after separation by suitable means (not shown) of excess aluminum chloride or hydrocarbon, if any, is pumped through a line 67 by a pump 68 into line 7 and thus into reaction vessel 5.

In operating the system described above with reference to Fig. 2 of the drawings, the production of catalyst in vessel 64 and removal of catalyst through line 23 are so coordinated that a constant amount of active catalyst is maintained in the system, and this is most advantageously and economically accomplished by so conducting the alkylation in vessel 5 and so regulating the fractionating system represented by columns 75, 80 and 84 that at least enough heavy alkylate bottoms is produced and pumped to vessel 64 to produce the necessary catalyst.

The pressure in the system included within vessels 5, 10, 20, 27 and 30 is maintained at the desired constant level by means of regulating valves 13 and 36.

This invention has been described with particular reference to certain specific embodiments and examples but it is not limited to such specific embodiments and examples except as defined in the appended claims.

What I claim is:

1. A method of rapidly conducting the conversion of paraffin hydrocarbons into other, branched-chain paraffin hydrocarbons in the liquid phase and in the presence of a liquid aluminum halide-hydrocarbon catalyst, which comprises so thoroughly and intimately contacting the hydrocarbon reactant material with the catalyst that a mixture is produced which has substantially no tendency to separate in the zone of reaction and which separates slowly by gravity separation after withdrawal from the zone of reaction, withdrawing such mixture from the zone of reaction and introducing it into a first separating vessel and separating the mixture therein into a liquid layer comprising the major part of the reaction product substantially free from catalyst and a liquid layer comprising catalyst containing a substantial amount of reaction product, separately withdrawing the substantially catalyst-free reaction product and the reaction product catalyst mixture from said vessel, recycling the major part of the withdrawn reaction product catalyst mixture to the zone of reaction, introducing a minor part of the withdrawn reaction product catalyst mixture into a second separating vessel and therein effecting a substantially complete separation of catalyst and reaction product, and separately withdrawing the substantially catalyst free reaction product and the thus separated catalyst from said second separating vessel.

2. The method of claim 1, wherein the separations of catalyst from reaction product are by gravity separation.

3. A method of rapidly and uniformly conducting the conversion of paraffin hydrocarbons into other, branched-chain paraffin hydrocarbons in the liquid phase and in the presence of a liquid aluminum halide-hydrocarbon catalyst, which comprises so thoroughly and intimately contacting the hydrocarbon reactant material with the catalyst that a mixture is produced which has substantially no tendency to separate in the zone of reaction and which separates slowly by gravity separation after withdrawal from the zone of reaction, maintaining in said zone of reaction substantially constant temperature and pressure, withdrawing said mixture from the zone of reaction and introducing it into a first separating vessel and separating the mixture therein into a liquid layer comprising the major part of the reaction product substantially free from catalyst and a liquid layer comprising catalyst containing a substantial amount of reaction product, separately withdrawing the substantially catalyst-free reaction product and the reaction product catalyst mixture from said vessel, recycling the major part of the withdrawn reaction product catalyst mixture to the zone of reaction, introducing a minor part of the withdrawn reaction product catalyst mixture into a second separating vessel and therein effecting a substantially complete separation of catalyst and reaction product, and separately withdrawing the substantially catalyst-free reaction product and the thus separated catalyst from said second separating vessel.

4. The method of claim 3, wherein the separations of catalyst from reaction product are by gravity separation.

5. A method of rapidly conducting the isomerization of paraffin hydrocarbons in the liquid phase and in the presence of a liquid aluminum halide-hydrocarbon catalyst, which comprises so thoroughly and intimately contacting the reactant paraffin with the catalyst that a mixture is produced which has substantially no tendency to separate in the zone of reaction and which separates slowly by gravity separation after withdrawal from the zone of reaction, withdrawing such mixture from the zone of reaction and introducing it into a first separating vessel and separating the mixture therein into a liquid layer comprising the major part of the reaction product substantially free from catalyst and a liquid layer comprising catalyst containing a substantial amount of reaction product, separately withdrawing the substantially catalyst-free reaction product and the reaction product catalyst mixture from said vessel, recycling the major part of the withdrawn reaction product catalyst mixture to the zone of reaction, introducing a minor part of the withdrawn reaction product catalyst mixture into a second separating vessel and therein effecting a substantially complete separation of catalyst and reaction product, and separately withdrawing the substantially catalyst-free reaction product and the thus separated catalyst from said second separating vessel.

6. A method of rapidly and uniformly conducting the isomerization of paraffin hydrocarbons in the liquid phase and in the presence of a liquid aluminum chloride-hydrocarbon catalyst, which comprises so thoroughly and intimately contacting the reactant paraffin with the catalyst that a mixture is produced which has substantially no tendency to separate in the zone of reaction and which separates slowly by gravity separation after withdrawal from the zone of reaction, maintaining in said zone of reaction substantially constant temperature and pressure, withdrawing said mixture from the zone of reaction and introducing it into a separating vessel of relatively large size and separating the mixture therein by gravity separation into a liquid layer comprising the major part of the reaction product substantially free from catalyst and a liquid layer comprising catalyst containing a substantial amount of reaction product, separately withdrawing the substantially catalyst-free reaction product and the reaction product catalyst mixture from said vessel, recycling the major part of the withdrawn reaction product catalyst mixture to the zone of reaction, introducing a minor part of the withdrawn reaction product catalyst mixture into a separating vessel of relatively small size and therein effecting a substantially complete gravity separation of catalyst and reaction product, and separately withdrawing the substantially catalyst-free reaction product and the thus separated catalyst from said separating vessel of relatively small size.

7. A method of rapidly conducting the alkylation of paraffins with olefins in the liquid phase and in the presence of a liquid aluminum halide-hydrocarbon catalyst, which comprises so thoroughly and intimately contacting a liquid mixture of a paraffin and an olefin with the catalyst that a mixture is produced which has substantially no tendency to separate in the zone of reaction and which separates slowly by gravity separation after withdrawal from the zone of reaction, withdrawing such mixture from the zone of reaction and introducing it into a first separating vessel and separating the mixture therein into a liquid layer comprising the major part of the reaction product substantially free from catalyst and a liquid layer comprising catalyst containing a substantial amount of reaction product, separately withdrawing the substantially catalyst-free reaction product and the reaction product catalyst mixture from said vessel, recycling the major part of the withdrawn reaction product catalyst mixture to the zone of reaction, introducing a minor part of the withdrawn reaction product catalyst mixture into a second separating vessel and therein effecting a substantially complete separation of catalyst and reaction product, and separately withdrawing the substantially catalyst-free reaction product and the thus separated catalyst from said second separating vessel.

8. A method of rapidly and uniformly conducting the alkylation of paraffins with olefins in the liquid phase and in the presence of a liquid aluminum chloride-hydrocarbon catalyst, which comprises so thoroughly and intimately contacting a liquid mixture of a paraffin and an olefin with the catalyst that a mixture is produced which has substantially no tendency to separate in the zone of reaction and which separates slowly by gravity separation after withdrawal from the zone of reaction, maintaining in said zone of reaction constant temperature and pressure, withdrawing said mixture from the zone of reaction and introducing it into a separating vessel of relatively large size and separating the mixture therein by gravity separation into a liquid layer comprising the major part of the reaction product substantially free from catalyst and a liquid layer comprising catalyst containing a substantial amount of reaction product, separately withdrawing the substantially catalyst-free reaction product and the reaction product catalyst mixture from said vessel, recycling the major part of the withdrawn reaction product catalyst mixture to the zone of reaction, introducing a minor part of the withdrawn reaction product catalyst mixture into a separating vessel of relatively small size and therein effecting a substantially complete gravity separation of catalyst and reaction product, and withdrawing the substantially catalyst-free reaction product and the thus separated catalyst from said separating vessel of relatively small size.

9. The method of claim 6, wherein said reactant paraffin is normal butane.

10. The method of claim 8, wherein said liquid mixture of a paraffin and an olefin is a liquid mixture of isobutane and at least one olefin of the group consisting of $C_2$ to $C_4$ olefins.

11. A method of isomerizing normal parffins to isoparaffins, which comprises contacting a normal paraffin feed in liquid state with a liquid aluminum halide-hydrocarbon catalyst so thoroughly and intimately as to produce a mixture which has substantially no tendency to separate in the zone of reaction and which separates slowly by gravity separation after withdrawal from the zone of reaction, and maintaining in the zone of reaction a constant temperature and a time of contact sufficient to produce rapid isomerization and to produce a substantial amount of isoparaffin material of higher molecular weight than said normal paraffin feed, withdrawing said mixture from the zone of reaction and separating from it by gravity separation the major part of the reaction product substantially free from catalyst and catalyst containing a substantial amount of reaction product, recycling the major part of the reaction product catalyst mixture to the zone of reaction, effecting a substantially complete gravity separation of a minor part of the reaction product catalyst mixture into catalyst and reaction product, discharging the thus completely separated portion of the catalyst from the system, fractionating the separated substantially catalyst-free reaction product, separating a normal paraffin fraction of the same molecular species as said normal paraffin feed, an isoparaffin fraction of the same molecular weight as said normal paraffin feed, and an isoparaffin fraction of higher molecular weight than said normal paraffin feed, recycling said normal paraffin fraction to the zone of reaction, and producing an amount of fresh catalyst substantially equal to the catalyst discharged from the system by heating an aluminum halide with at least a portion of said isoparaffin fraction of higher molecular weight.

12. The method of claim 11, wherein said normal paraffin feed is normal butane and said aluminum halide is aluminum chloride.

13. A method of alkylating paraffins with olefins, which comprises contacting a paraffin-olefin feed in the liquid-state with a liquid aluminum halide-hydrocarbon catalyst so thoroughly and intimately as to produce a mixture which has substantially no tendency to separate in the zone of reaction and which separates slowly by gravity separation after withdrawal from the zone of reaction, and maintaining a temperature, a time of contact and a paraffin-olefin ratio in the zone of reaction sufficient to produce rapid alkylation and to produce a substantial amount of $C_9$ and higher isoparaffins, withdrawing said mixture from the zone of reaction and separating from it by gravity separation the major part of the reaction product substantially free from catalyst and catalyst containing a substantial amount of reaction product, recycling the major part of the reaction product catalyst mixture to the zone of reaction, effecting a substantially complete gravity separation of a minor part of the reaction product catalyst mixture into catalyst and reaction product, discharging the thus completely separated portion of the catalyst from the system, fractionating the separated substantially catalyst-free reaction product, separating a paraffin fraction of the same molecular species as the paraffin in said paraffin-olefin feed, an isoparaffinic fraction consisting essentially of gasoline boiling range hydrocarbons, and a $C_9$ and higher iso-paraffinic fraction, recycling said paraffin fraction of the same molecular species to the zone of reaction, and producing an amount of fresh catalyst substantially equal to the catalyst dischrged from the system by heating an aluminum halide with at least a portion of said $C_9$ and higher iso-paraffinic fraction.

14. The method of claim 13, wherein said paraffin-olefin feed is composed principally of isobutane and at least one olefin of the group consisting of $C_2$ to $C_4$ olefins, and said aluminum halide is aluminum chloride.

POVL OSTERGAARD.